(12) United States Patent
Kogut

(10) Patent No.: US 9,849,843 B2
(45) Date of Patent: *Dec. 26, 2017

(54) VEHICLE BODY PANEL RETRIEVAL TOOL AND STORAGE COMPARTMENT

(71) Applicant: Andrew W. S. Kogut, West Chatham, MA (US)

(72) Inventor: Andrew W. S. Kogut, West Chatham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,197

(22) Filed: Feb. 8, 2017

(65) Prior Publication Data

US 2017/0190302 A1 Jul. 6, 2017

Related U.S. Application Data

(63) Continuation-in-part of application No. 14/833,778, filed on Aug. 24, 2015, now Pat. No. 9,598,024.

(60) Provisional application No. 62/117,354, filed on Feb. 17, 2015.

(51) Int. Cl.
  *B60R 11/06* (2006.01)
  *B60R 11/00* (2006.01)

(52) U.S. Cl.
  CPC ......... *B60R 11/06* (2013.01); *B60R 2011/004* (2013.01); *B60R 2011/0019* (2013.01); *B60R 2011/0047* (2013.01); *B60R 2011/0049* (2013.01); *B60R 2011/0052* (2013.01)

(58) Field of Classification Search
  CPC ....... B62D 33/0273; B60R 3/02; B60R 11/06; B60R 11/00; B60R 2011/004; B60D 1/00
  See application file for complete search history.

(56) References Cited

U.S. PATENT DOCUMENTS

| 3,081,126 A | 3/1963 | Theberge |
| 5,800,004 A | 9/1998 | Ackeret |
| 6,199,930 B1 | 3/2001 | Riley |

(Continued)

FOREIGN PATENT DOCUMENTS

| DE | 102005059726 A1 | 6/2007 |
| FR | 2871423 A1 | 12/2005 |

OTHER PUBLICATIONS

U.S. Appl. No. 14/833,778, filed Sep. 9, 2015, Kogut.

(Continued)

*Primary Examiner* — Corey Skurdal
(74) *Attorney, Agent, or Firm* — Daly, Crowley, Mofford & Durkee, LLP

(57) ABSTRACT

An apparatus includes a mounting bracket configured to mount to an outer surface of a body panel of a vehicle, a latch mechanism coupled to the mounting bracket, and an elongate member detachable from the mounting bracket and insertable into the opening. The elongate member comprises a body and a handle comprising a rod having a diameter smaller than the opening to allow the elongate member to be inserted into and removed from the opening; a handle comprising a coupling mechanism configured to engage with the latch mechanism so that the elongate member can be secured to the mounting bracket such that, when secured, at least a portion of the body of the elongate member is positioned within an inside cavity of the body panel; and a detachable coupling mechanism configured to detachably engage with one or more tool ends.

19 Claims, 8 Drawing Sheets

(56) References Cited

U.S. PATENT DOCUMENTS

| | | |
|---|---|---|
| 6,450,557 B1 | 9/2002 | Martinez |
| 6,502,885 B1 | 1/2003 | Gammon et al. |
| 6,905,158 B1 | 6/2005 | Bastian |
| 7,334,825 B1 * | 2/2008 | Sammon .................. B25H 5/00 294/24 |
| 7,478,851 B2 | 1/2009 | Geller |
| 7,549,692 B2 | 6/2009 | Washington |
| 8,029,035 B1 | 10/2011 | Bottner |
| 8,915,529 B1 | 12/2014 | Bond |
| 9,016,748 B1 | 4/2015 | Ardigo |
| 2004/0113450 A1 | 6/2004 | Fielding |
| 2009/0039231 A1 | 2/2009 | McLaughlin |
| 2012/0325877 A1 | 12/2012 | Franks |

OTHER PUBLICATIONS

U.S. Non-Final Office Action dated Jul. 1, 2016 for U.S. Appl. No. 14/833,778; 7 Pages.

Du-Ha Storage Solutions for Pickup Trucks, www.du-ha.com; accessed on May 19, 2015; 6 pages.

Response to U.S. Non-Final Office Action dated Jul. 1, 2016 for U.S. Appl. No. 14/833,778; Response filed on Aug. 19, 2016; 11 Pages.

Notice of Allowance dated Nov. 10, 2016 for U.S. Appl. No. 14/833,778; 5 Pages.

Edsall, "Tailhook Reaches Pickup Bed's Far Corners;" Detroit News; Dec. 22, 2016; 2 Pages.

* cited by examiner

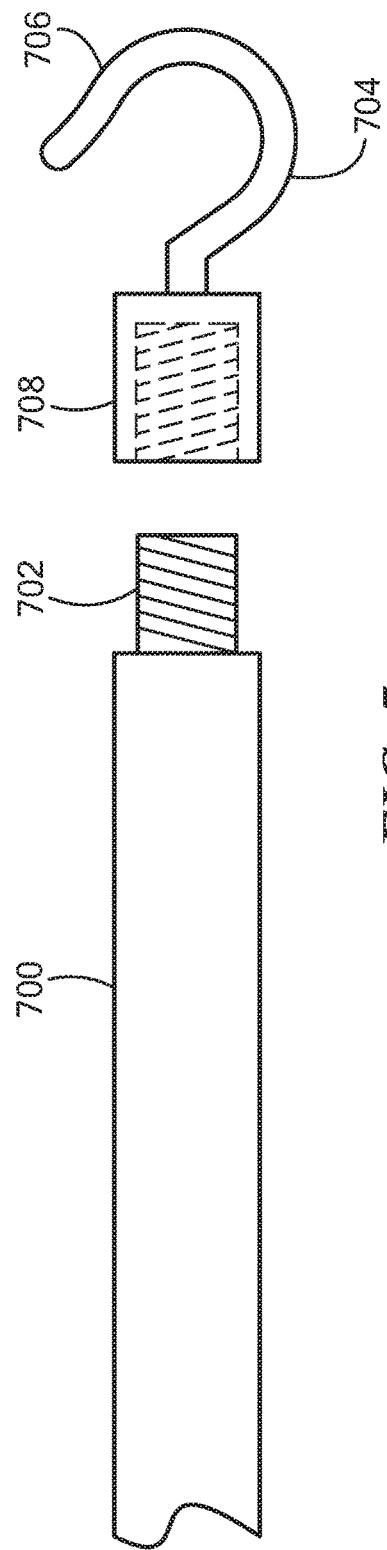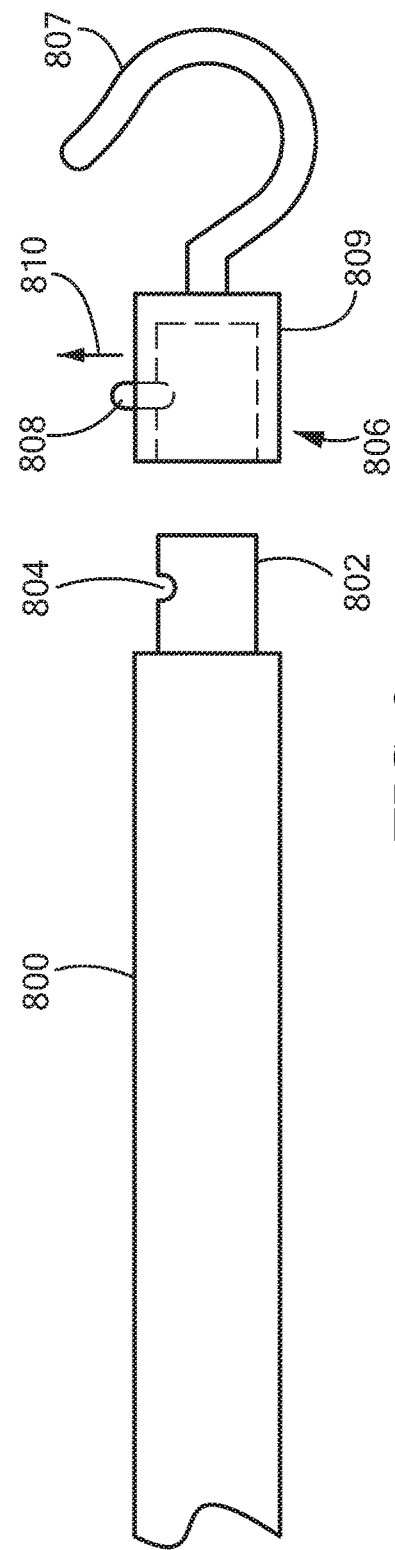

VEHICLE BODY PANEL RETRIEVAL TOOL AND STORAGE COMPARTMENT

RELATED APPLICATIONS

This application is a CONTINUATION-IN-PART of, and claims priority and to and benefit of, U.S. patent application Ser. No. 14/833,778 (filed Aug. 24, 2015). This application also claims priority to and benefit of U.S. Provisional Patent Application No. 62/117,354 (filed Feb. 17, 2015). The applications listed in this section are incorporated here by reference in their entirety.

FIELD

This disclosure relates to storage containers and, more particularly, to storage containers for containing a tool within a body panel of a vehicle.

BACKGROUND

Many vehicles carry cargo from place to place. Trucks, trains, airplanes, cars, boats, and other vehicles often have storage compartments or beds that can be used to transport cargo.

Sometimes the cargo must be stored in an area of the storage compartment that is difficult to reach. For example, if the cargo is heavy it may be required to be placed in a certain portion of the storage compartment or bed so that the payload is properly distributed. As another example, if there is a large amount of cargo, at least some of the cargo might be placed in an out-of-reach area of the storage compartment so that the rest of the cargo can fit. And also, the cargo can shift into an out-of-reach area during transport. For example, if a pickup truck brakes quickly, cargo in the truck bed may slide toward the front of the truck where it is difficult to reach.

SUMMARY

In an embodiment, an apparatus comprises a mounting bracket configured to mount to a surface of a tailgate adjacent to an opening in the tailgate; a latch mechanism coupled to the mounting bracket; an elongate member comprising a body and a coupling mechanism configured to couple to the latch mechanism so that, when secured, at least a portion of the body of the elongate member is positioned within an inside cavity of the tailgate.

In another embodiment, a vehicle comprises a rear door; a mounting bracket configured to mount to a surface of the rear door adjacent to an opening in the rear door; a latch mechanism coupled to the mounting bracket; an elongate member comprising a body and a coupling mechanism configured to couple to the latch mechanism so that, when secured, at least a portion of the body of the elongate member is positioned within an inside cavity of the rear door.

In another embodiment, a vehicle comprises a body panel; a mounting bracket configured to mount to a surface of the body panel adjacent to an opening in the body panel; a latch mechanism coupled to the mounting bracket; an elongate member comprising a body and a coupling mechanism configured to couple to the latch mechanism so that, when secured, at least a portion of the body of the elongate member is positioned within an inside cavity of the body panel of the vehicle.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

FIG. 7 is a diagram of an elongate member and detachable tool end.

FIG. 8 is a diagram of an elongate member and detachable tool end.

DETAILED DESCRIPTION

Figure 1:
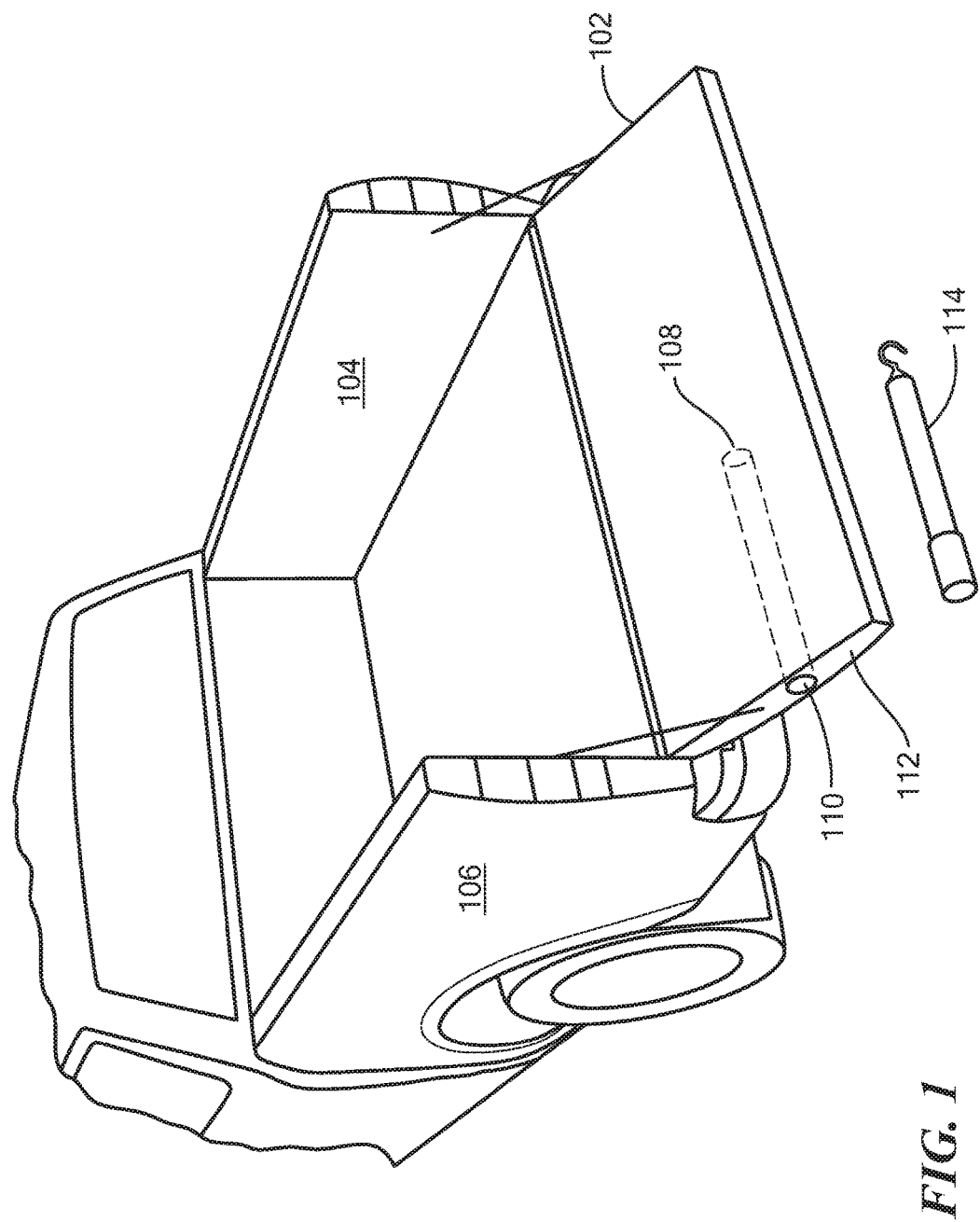
FIG. 1 is a diagram of a truck bed with a storage area for a tool.

FIG. 1 is a diagram of a truck bed 100 including a tailgate 102 and side walls 104 and 106. Tailgate 102 is shown in the open position to provide easier access to the truck bed 100.

Tailgate 102 may be a three-dimensional structure having an internal cavity 108, comprising a space between the walls of the tailgate. In an embodiment, cavity 108 may be a cylindrical cavity as shown in FIG. 1. In other embodiments, cavity 108 may be any opening or space of any shape internal to tailgate 102.

Tailgate 102 also includes an opening 110 on a side 112 of the tailgate. Opening 110 provides access to cavity 108 so that a tool, such as retrieval hook 114, can be inserted into opening 110 and stored in cavity 108. In other embodiments, opening 110 may be located on an opposite side, top, bottom, or any other surface of tailgate 102. Tailgate 102 may also include multiple openings (not shown) into which various tools can be inserted and stored. In embodiments, tailgate 102 may include a separate cavity associated with each opening, one or more shared cavities associated with more than one opening, or a single cavity associated with all openings in tailgate 102.

In an embodiment, tailgate 102 may be attached to truck bed 100 by a hinge or series of hinges. Tailgate 102 may be closed by being lifted up so that it forms a rear wall of the truck bed 100. Tailgate 102, when closed, may latch to side walls 104 and 106 so that it does not inadvertently open. When in the closed position, opening 110 may be hidden from view between tailgate 102 and side wall 106. In this embodiment, if a user wants to access opening 110, the user must first open the tailgate. In other embodiments, opening 110 may be positioned so that it is accessible when the tailgate is opened, when the tailgate is closed, or both.

Figure 2:
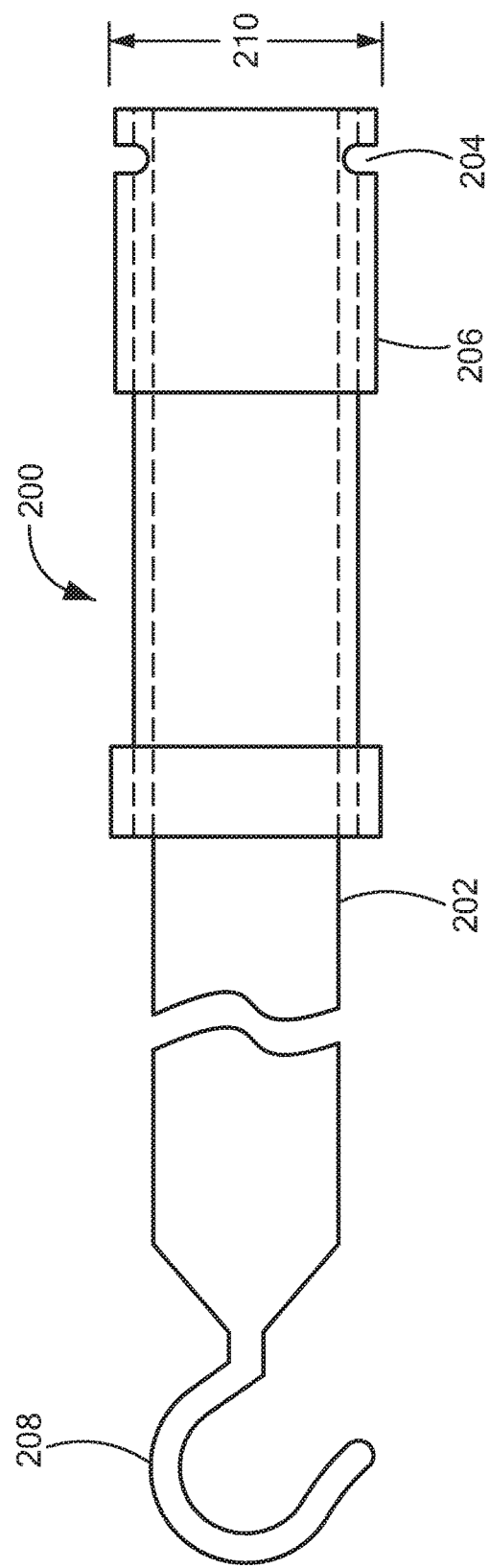
FIG. 2 is a diagram of a retrieval tool.

Referring to FIG. 2, an elongate member 200 that may be stored within cavity 108 includes a body 202 and a coupling mechanism 204. As will be described below, coupling mechanism 204 may engage with a mount and/or latch to secure elongate member 200 within cavity 108 for storage. Elongate member 200 may also include a handle 206 that can be grasped by a user. In an embodiment, coupling mechanism 204 may be included as part of handle 206 as shown. However, this is not required. Coupling mechanism 206 may be included as part of body 202 or may be a separate part attached to elongate member 200.

As shown, coupling mechanism 204 may be a groove or slot that can be engaged by a locking mechanism or mount. In general, however, coupling mechanism 204 may be any type of device that can engage with a mount or bracket so that elongate member can be secured in place within cavity 108. Examples include a groove, a protrusion, a ballooning or telescoping member, a cover or latch, etc.

In an embodiment, body 202 may be a telescoping body that can be extended or shortened. When body 202 is shortened, it may have a length that is sufficiently short so that elongate member 200 can fit within cavity 108. When body 202 is extended, its length may or may not be sufficiently short to fit within cavity 108, depending on the length of body 202 and the size of cavity 108.

In an embodiment, elongate member 200 may include a hook 208 on an end opposite handle 206. Hook 208 may have a width 210 that is less than the diameter of opening 110 so that hook 208 can fit through opening 110. In other embodiments, hook 208 may be a foldable or retractable hook which, when folded or retracted, can fit through opening 110.

As shown, in an embodiment, elongate member 200 may be a retrieval hook. Although shown as a retrieval hook with a hook 208 on one end, elongate member 200 may be any type of tool including, but not limited to, a hammer, a bat, a rake, a ruler, a level, or any other type of useful tool that can be inserted into opening 110 and stored in cavity 108. In some embodiments, elongate member 200 may be a relatively large tool that fills cavity 108. In other embodiments, elongate member 200 may be a smaller tool that does not fully fill cavity 108.

Figure 3A:
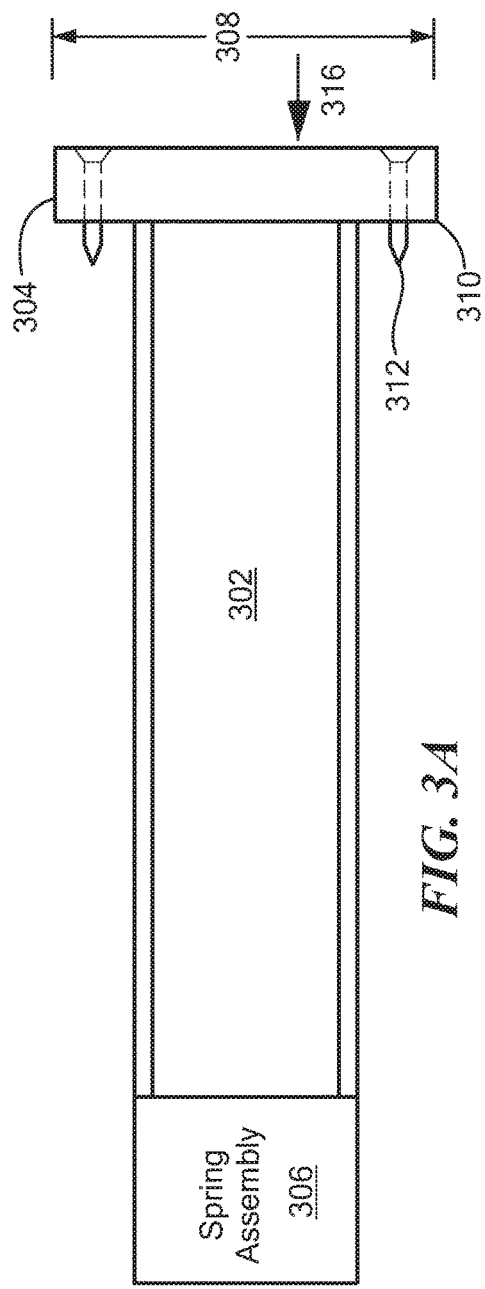
FIG. 3A and FIG. 3B are diagrams of a storage container.

Referring to FIG. 3A, a storage container 300 that may be configured to hold elongate member 200 within. Storage container 300 may include a sheath 302, a mounting bracket 304, and a spring assembly 306. In an embodiment, sheath 302 is a cylindrical sheath. In other embodiments sheath 302 may have a rectangular shape or any other shape capable of enclosing elongate member 200. Storage container 300 may be installed in tailgate 102 so that sheath 302 and spring assembly 306 are contained inside cavity 108. Mounting bracket 304 may engage the outer surface of opening 110 (i.e. the surface of side 112). In an embodiment, the diameter 308 of mounting bracket 304 may be larger than the diameter of opening 110 so that inner surface 310 can engage the outer surface of tailgate side 112. Mounting bracket 304 may be fastened to side 112 (by screws 312, glue, rivets, or any other type of fastener) so that storage container 300 is permanently or semi-permanently installed in tailgate 102.

In an embodiment, diameter 314 of sheath 302 may be smaller than the diameter of opening 110 so that storage container 300 can be inserted into opening 110 during installation. The diameter of spring assembly 306 may also be smaller than the diameter of opening 110 so it can be inserted into opening 110.

In embodiments, at least some portions of storage container 300 may be constructed from metals, plastics, graphite, carbon-fiber, fiberglass, or any other suitable material. In an embodiment, storage container 300 may be constructed from a hard or rigid material. In other embodiments, storage container and/or sheath 302 may be constructed of a non-rigid material (e.g. a woven cloth or non-rigid plastic) so that storage container 300 forms a sock-like enclosure. In some embodiments, some portions of storage container 300 may be metal and other portions plastic, and some portions of storage container 300 may be rigid while other portions are non-rigid. For example, in one embodiment, sheath 302 may be a non-rigid material while mounting bracket 304 and/or spring assembly 306 are constructed from a rigid material.

Figure 3B:
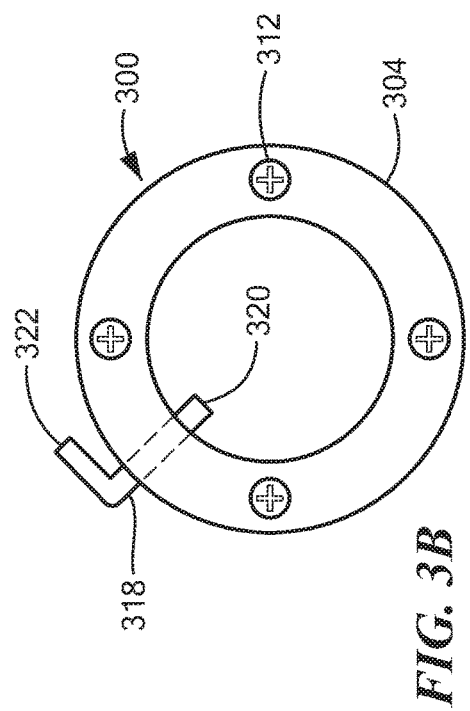

FIG. 3B is a diagram of storage container 300 as viewed from the direction of arrow 316. As shown, in an embodiment, mounting bracket 304 may be a flange.

Storage container 300 may also include a locking mechanism 318. In the embodiment shown, locking mechanism 318 may be a pin having an end 320 which, when moved toward the center axis of storage container 300 can engage and secure elongate member 200 in place. For example, assume that elongate member has been inserted into storage container 300. End 320 of pin 318 may move toward the center axis of storage container 300 until end 320 engages and fits within groove 204 of elongate member 200 (See FIG. 2). When end 320 is fitted within groove 204, it may hold elongate member 200 in place and prevent elongate member 200 from moving further into or moving out of storage container 300. In an embodiment, pin 318 may be spring loaded and biased toward the center axis of storage container 300 so that, when elongate member is inserted into storage container 300, pin 318 can automatically engage groove 204 to hold elongate member 200 in place. Pin 318 may also have a handle 322 with which a user can disengage pin 318 from groove 204 in order to remove elongate member 200 from storage container 302. Although shown as an angled portion of pin 318, handle 322 may be any type of handle including, but not limited to an angled portion, a ball or sphere coupled to pin 318, a rough or scored area of pin 318 that can increase friction when held, a flattened portion of pin 318, etc.

Figure 4A:
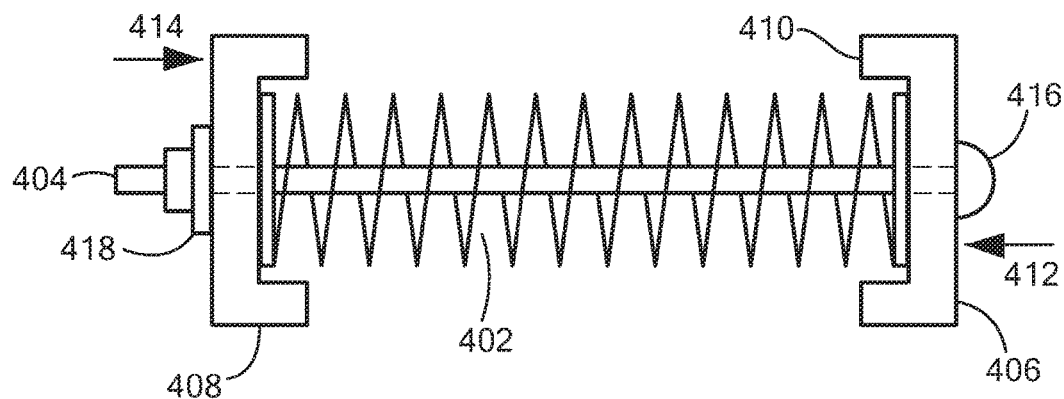
FIG. 4A and FIG. 4B are diagrams of embodiments of a spring assembly.

Referring to FIG. 4A, an embodiment of a spring assembly 400 may be the same as or similar to spring assembly 306. Spring assembly 400 may include a spring 402 positioned around a spindle 404. A first plate 406 and a second plate are positioned on either end of spring 402. The plates may include protrusions 410 to keep spring 402 centered around spindle 404.

Plate 406, plate 408, or both may be movably coupled to spindle 404 so that, if a force is applied in the direction of arrow 412 or 414, plate 406 and/or 408 may be pushed toward the other plate to compress spring 402.

Spring assembly may also include stopper 416 and stopper 418 to prevent plate 406 and plate 408 from traveling beyond the end of spindle 404.

In an embodiment, spindle 404 may be a threaded screw, stopper 416 may be the head of the screw, stopper 418 may comprise a nut and washer, and plates 406 and 408 may be washers. In embodiments, rivets may be used to hold plates 406 and/or 408 in place. For example, a rivet may extend from the exterior of body 422 into the interior of body 422. The rivet may be placed so that plate 410 buts up against the rivet and cannot extend past a certain point into body 422.

Figure 4B:
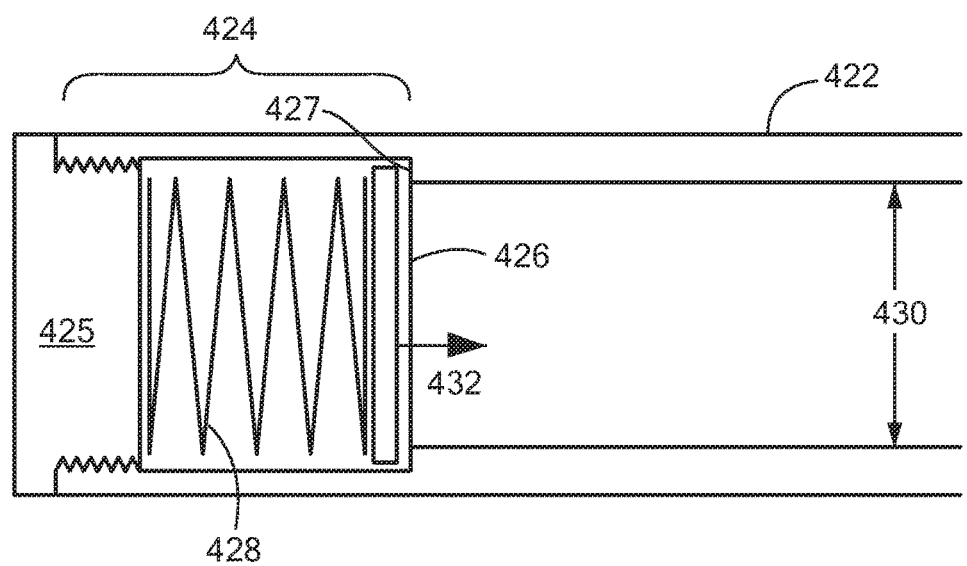

Referring to FIG. 4B, another embodiment of a spring assembly 420 may be the same as or similar to spring assembly 306. In this embodiment, the body 422 of sheath 302 may include a section 424 having an inner diameter that is larger than the inner diameter 430 of the rest of sheath 302, so as to form a ridge 427 on the inside of body 422. A plate 426 is positioned between ridge 426 and a spring 428. The diameter of plate 426 is larger than inner diameter 430 so that, when spring 428 pushes plate 426 in the direction of arrow 432, plate 426 presses against ridge 426 which acts as a stopper.

In another embodiment, if body 422 does not include ridge 427 for example, a stopper 434 may be positioned within body 422 so that, when spring 428 pushes plate 426 in the direction of arrow 432, plate 426 presses against stopper 434 and does not extend further into body 422. One stopper 434 is shown in FIG. 4B, however more than one stopper may be positioned around body 422 to prevent plate 426 from extending further into body 422. In embodiments, stopper 434 may be a rivet that extends into body 422.

Spring assembly 420 also includes an end cap 425 to hold spring 428 within section 424. In an embodiment, the end cap 425 and body 422 may be threaded so that end cap 425 can be screwed onto body 422. In other embodiments, end cap 425 and body 422 may not be threaded. In such embodiments, end cap 425 may be a plug that fits securely into the end of body 422. In other embodiments, end cap 425 may be glued, welded, bolted, or otherwise fastened to body 422 using any desirable fastening technique.

Figure 5:
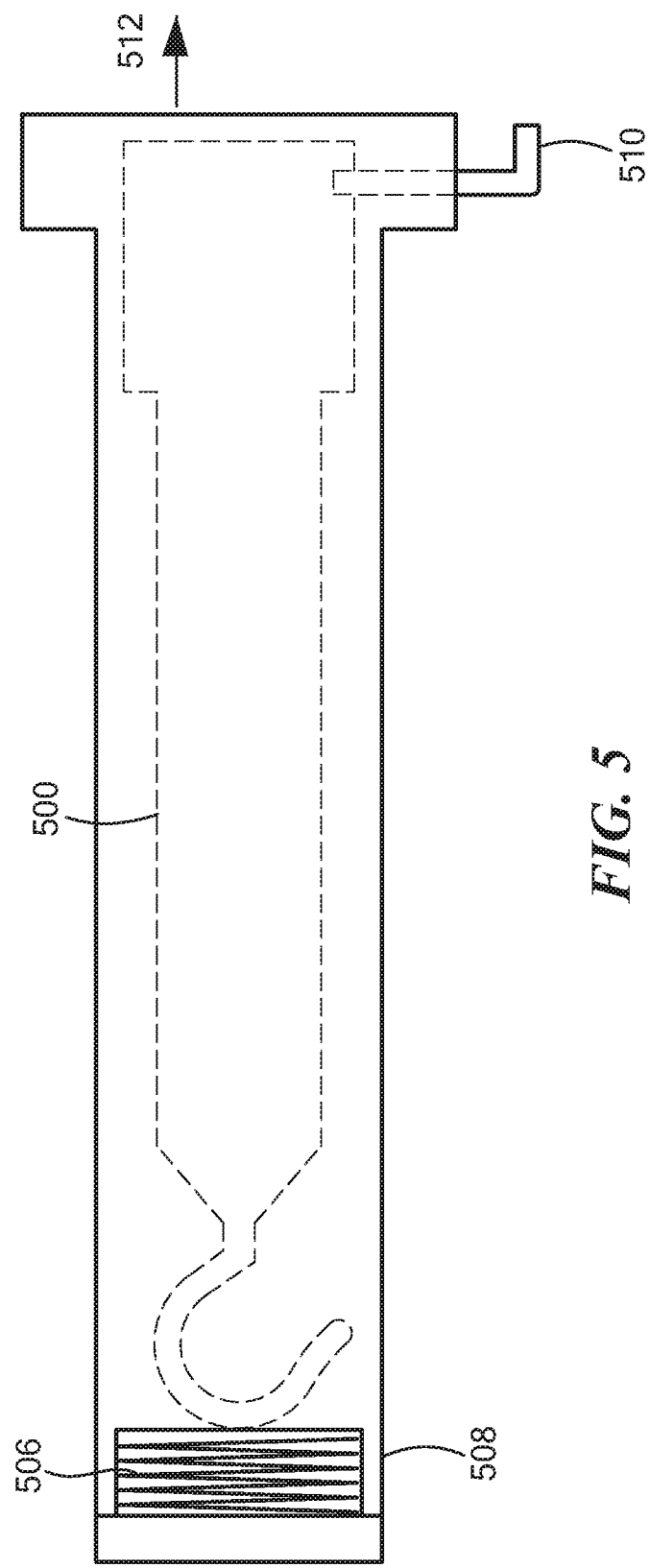
FIG. 5 is a diagram of a storage container containing a retrieval tool.

FIG. 5 is a diagram of a retrieval hook 500 positioned for storage within a storage container 502. Retrieval hook 500 may be the same as or similar to elongate member 200, and storage container 502 may be the same as or similar to storage container 300. In an embodiment, the length of retrieval hook 500 may be similar to or slightly longer than the length of the inner cavity of storage container 502 so that, when pushed into storage container 300, the end 504 of retrieval hook 500 compresses spring 506 in spring assembly 508 (which may be the same as or similar to spring assembly 306). While spring 506 is compressed, locking mechanism 510 (which may be the same as or similar to locking mechanism 318) may engage the end of retrieval hook 500 to secure it in place. Because spring 506 is compressed, retrieval hook 500 may be under compression while stored and locked in place so that it does not move during transport. When locking mechanism 510 is disengaged, spring assembly 508 may push the end of retrieval hook 500 out of storage container 510 in the direction of arrow 512 so that a user can more easily grab retrieval hook 500.

Figure 6A:
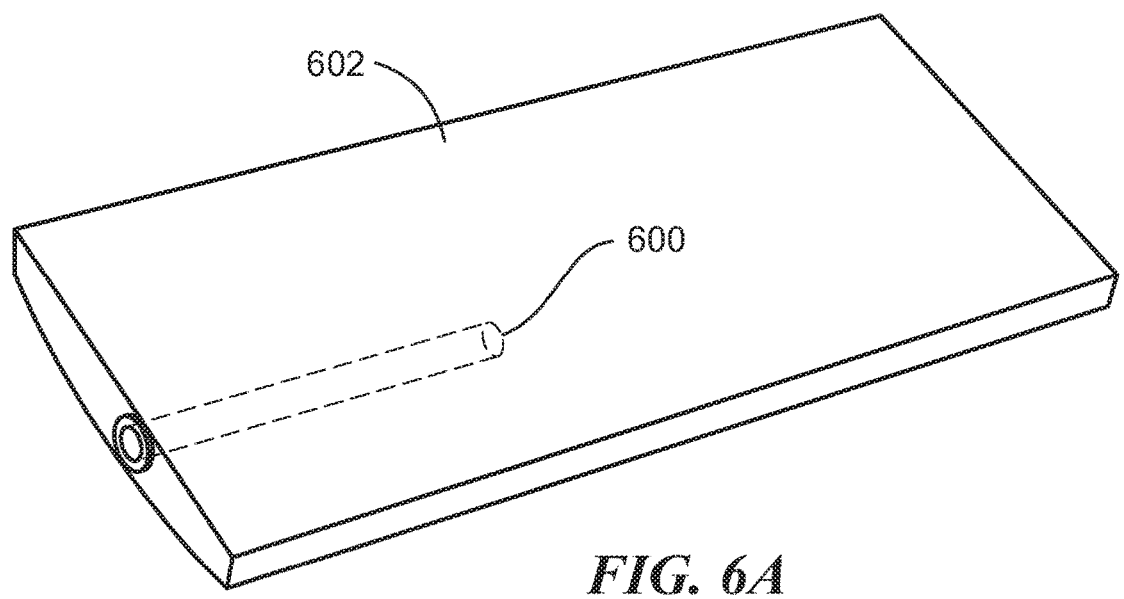
FIG. 6A and FIG. 6B are diagrams of a storage container installed in a tailgate.
Figure 6B:
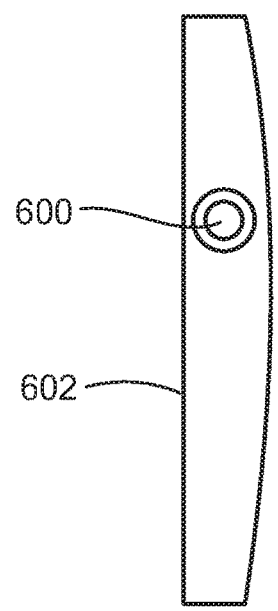

Referring to FIG. 6A and 6B, storage container 600 may be the same as or similar to storage container 300. In FIG. 6A and FIG. 6B, storage container 600 is shown installed in a tailgate 602. In operation, a user may store an elongate member (e.g. a retrieval hook or other tool) within storage container 600 as described above. When the user needs to reach a difficult to reach object, for example in the bed of a pickup, the user can open the tailgate, remove the retrieval hook from storage container 600, and use the hook to retrieve the item. When done, the user can once again store the retrieval hook within storage container 600.

In an embodiment, storage container 600 may be installed in an already assembled tailgate. Storage container 600 may also be installed in other locations in a vehicle including, but not limited to, a tailgate, bumper, fender, body panel, etc. For example, storage container 600 may be sold as an after-market product that can be installed in a tailgate, rear door or hatchback hatch, bumper, fender, or other body panel of a vehicle. In other embodiments, storage container 600 may be designed into the tailgate (or other vehicle body part) and installed or manufactured as part of the original vehicle. In certain embodiments, the sheath 302 may not be necessary if the body part into which the assembly is installed has an inner cavity that can act similarly to sheath 302 to store an elongate member.

Referring to FIG. 7, elongate member 700 may be the same as or similar to elongate member 200 described above. In embodiments, elongate member 700 may have a handle disposed at one end (not shown in FIG. 7) and a detachable coupling mechanism 702 disposed at an opposite end. As shown in FIG. 7, detachable coupling mechanism may be a threaded section of elongate member that can couple with a detachable tool end 704.

Detachable tool end 404 may comprise a tool 706 attached to a coupling mechanism 708. Coupling mechanism 708 may engage with detachable coupling mechanism 702 to attach and detach tool end 704 from elongate member 700. In an embodiment, detachable coupling mechanism 708 may be a threaded screw and coupling mechanism 708 may the a threaded receiver. Detachable coupling mechanism 702 may be inserted into the receiver (i.e. coupling mechanism 708) and turned until tool end 704 is secured to elongate member 700.

Referring to FIG. 8, elongate member 800 may be the same as or similar to elongate member 200 described above. In embodiments, elongate member 700 may have a handle disposed at one end (not shown in FIG. 8) and a detachable coupling mechanism 802 disposed at an opposite end. As shown in FIG. 8, detachable coupling mechanism may be a groove 804 that can couple with a detachable tool end 806.

Detachable tool end 806 may comprise a tool 807 attached to a coupling mechanism 708. Coupling mechanism 708 may engage with detachable coupling mechanism 802 to attach and detach tool end 804 from elongate member 800. In an embodiment, detachable coupling mechanism 808 may comprise one or more grooves 804 in the body of elongate member 800. The groove may extend completely around the circumference of elongate member 800 (or a portion thereof), or may extend partially around the circumference. In an embodiment, groove 804 may be one or more holes in elongate member 800.

Tool end 806 may include a coupling mechanism 809 having a pin 808 that can engage with groove 804. In an embodiment, pin 808 is a spring-loaded pin having a resting position that extends toward the center of coupling mechanism 809. In an embodiment, detachable coupling mechanism 802 may be inserted into the receiver (e.g. coupling mechanism 809). Insertion may cause pin 810 to move away from the center in the direction shown by arrow 810. When groove 804 is in line with pin 808, pin 808 may spring back into its resting position to become lodged in groove 804 to secure tool end 806 to elongate member 800.

In other embodiments, pin 808 may be located on coupling mechanism 802 and groove 804 may be located on the inner circumference of tool end 806 (e.g. on the inner circumference of coupling mechanism 809). In this arrangement, pin 808 may be spring loaded so that, when coupling mechanism 802 is inserted into coupling mechanism 809, the pin retracts into coupling mechanism 802 to allow the insertion. When the groove is adjacent to pin 808, pin 808 may extend into the groove to prevent tool end 809 from slipping off coupling mechanism 802.

In other embodiments, other mechanisms known in the art may be employed for attaching detachable tool end 802 to elongate member 800.

FIG. 7 and FIG. 8 illustrate embodiments where elongate member 700 and elongate member 800 comprise male coupling mechanisms 702 and 802, and tool ends 704 and 806 comprise female coupling mechanisms 708 and 809. In other embodiments, elongate members 700 and 800 may comprise female coupling mechanisms and tool ends 704 and 806 may comprise male coupling mechanisms.

Figure 9:
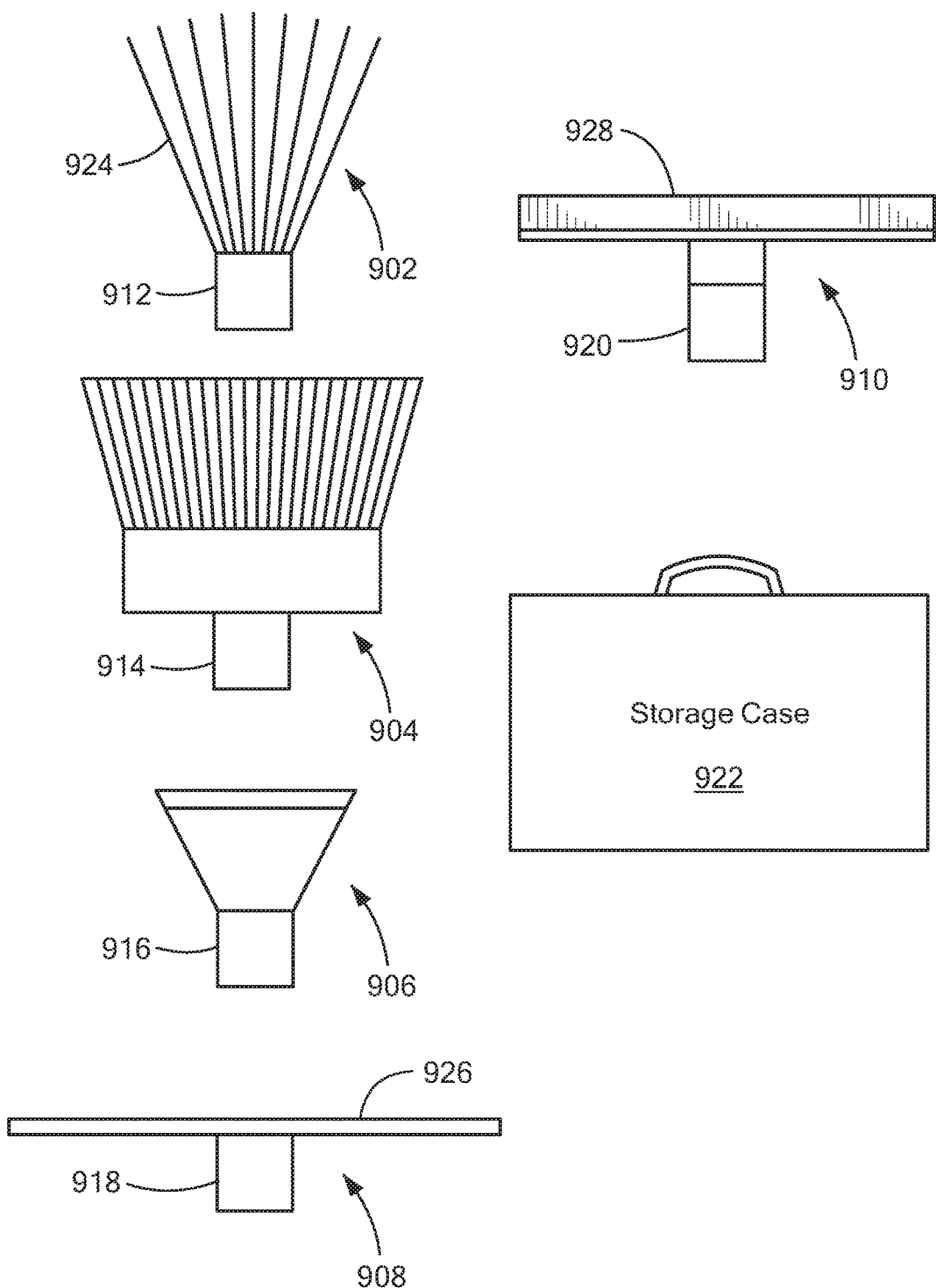
FIG. 9 is a diagram of detachable tool ends.

Referring to FIG. 9, examples of different types of detachable tool ends 902-910 that can be coupled to elongate member 700 or 800 are shown. These include a rake end 902, a broom end 904, an ice scraper 906, a snow rake 908, and a squeegee 910. Each of these detachable tool ends may include a coupling mechanism 912-920 that can couple the tool end to elongate member 700 or 800. The example tool ends in FIG. 9 are not limiting—other types of tool ends may be used including, but not limited to, vacuums, saws, cattle prods, knife blades, grasping tools, etc.

The tool end or the elongate member may include a power source, such as a battery, that can power the tool end. For example, if the tool end is a vacuum or other powered tool, one or more batteries stored in the tool end or elongate member may provide power to the tool end. In such an embodiment, the elongate member may include a hollow portion to house the batteries and electrical connections that couple to the positive and negative terminals of the batteries. In addition, if the batteries are located in the elongate member, detachable coupling mechanism 702 and 802, and coupling mechanisms 708 and 809, may include electrical contacts that couple to form a closed circuit between the elongate member and the tool end while the tool end is attached to the elongate member.

In embodiments, the batteries may be rechargeable. A battery recharger circuit (not shown) may be coupled to elongate member 700, to sheath 302, etc. In this case, electrical contacts may couple the battery (or the battery recharger) to the vehicle's electrical system so that the batteries may recharge while elongate member 700 is stored within sheath 302.

One or more tool ends may fold into a smaller shape that can be inserted into the opening 110 (see FIG. 1) for storage within a body panel of a vehicle. For example, tines 924 of rake 902 may fold inward to create a slimmer profile that can fit into opening 110. As another example, snow rake head 926 or squeegee head 928 may be on a pivot or hinge so that it can be folded to be in-line with elongate member 700 or 800 and inserted into opening 110.

A storage case 922 may be used to store one or more tool ends that are not in use. Storage case 922 may be coupled to a vehicle, for example in a trunk compartment, spare tire compartment, truck bed, on the underside of the vehicle's body, or in another unobtrusive location. In other embodiments, storage case 922 may not couple to a vehicle. In yet other embodiments, storage case 922 may detachably couple to a vehicle. A user may take tool ends from the storage case 922 and attach them to elongate member 700 or 800 as required.

Having described various embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

The invention claimed is:

1. An apparatus comprising:
    a mounting bracket configured to mount to an outer surface of a body panel of a vehicle, wherein the mounting bracket comprises a flange having a size larger than the opening and a surface that mounts to the outer surface of the body panel;
    a latch mechanism coupled to the mounting bracket; and
    an elongate member detachable from the mounting bracket and insertable into the opening, the elongate member comprising:
        a body and a handle comprising a rod having a diameter smaller than the opening to allow the elongate member to be inserted into and removed from the opening;
        a handle comprising a coupling mechanism configured to engage with the latch mechanism so that the elongate member can be secured to the mounting bracket such that, when secured, at least a portion of the body of the elongate member is positioned within an inside cavity of the body panel; and
        a detachable coupling mechanism configured to detachably engage with one or more tool ends.

2. The apparatus of claim 1 wherein the detachable coupling mechanism is a threaded end of the body.

3. The apparatus of claim 1 wherein the detachable coupling mechanism is a quick-release mechanism.

4. The apparatus of claim 3 wherein the quick-release mechanism comprises a groove in the body.

5. The apparatus of claim 1 wherein the tool ends comprise one or more of: a hook, a rake, a snow rake, an ice scraper, a broom, and a squeegee.

6. The apparatus of claim 1 wherein the handle is positioned at one end of the rod and the detachable coupling mechanism is positioned at an opposite end of the rod.

7. The apparatus of claim 1 wherein the detachable coupling mechanism is a male coupling mechanism and each of the one or more tool ends comprises a female coupling mechanism to engage with the male coupling mechanism.

8. The apparatus of claim 1 wherein the flange is a circular shaped flange or a rectangular shaped flange.

9. The apparatus of claim 1 wherein at least one of the tool end has a size smaller than the opening so the tool end can be inserted into and removed from the opening while attached to the body.

10. The apparatus of claim 1 wherein at least one of the tool ends is a foldable tool end configured to fold to a size smaller than the opening so the foldable tool end can be inserted into and removed from the opening while attached to the body.

11. A vehicle comprising:
    a rear door;
    a mounting bracket configured to mount to an outer surface of the rear door adjacent to an opening in the rear door, wherein the mounting bracket comprises a flange having a size larger than the opening and a surface that mounts to the outer surface of the rear door;
    a latch mechanism coupled to the mounting bracket; and
    an elongate member detachable from the mounting bracket and insertable into the opening, the elongate member comprising:
        a body and a handle comprising a rod having a diameter smaller than the opening to allow the elongate member to be inserted into and removed from the opening;
        a handle comprising a coupling mechanism configured to engage with the latch mechanism so that the elongate member can be secured to the mounting bracket such that, when secured, at least a portion of the body of the elongate member is positioned within an inside cavity of the tailgate; and
        a detachable coupling mechanism configured to detachably engage with one or more tool ends.

12. The vehicle of claim 11 wherein the rear door is a tailgate of a truck.

13. A vehicle comprising:
a body panel;
a mounting bracket configured to mount to an outer surface of the body panel adjacent to an opening in the body panel, wherein the mounting bracket comprises a flange having a size larger than the opening and a surface that mounts to the outer surface of the body panel;
a latch mechanism coupled to the mounting bracket; and
an elongate member detachable from the mounting bracket and insertable into the opening, the elongate member comprising:
 a body and a handle comprising a rod having a diameter smaller than the opening to allow the elongate member to be inserted into and removed from the opening;
 a handle comprising a coupling mechanism configured to engage with the latch mechanism so that the elongate member can be secured to the mounting bracket such that, when secured, at least a portion of the body of the elongate member is positioned within an inside cavity of the tailgate; and
 a detachable coupling mechanism configured to detachably engage with one or more tool ends.

14. The vehicle of claim 13 wherein at least one of the tool end has a size smaller than the opening so the tool end can be inserted into and removed from the opening while attached to the body.

15. The vehicle of claim 13 wherein at least one of the tool ends is a foldable tool end configured to fold to a size smaller than the opening so the foldable tool end can be inserted into and removed from the opening while attached to the body.

16. The vehicle of claim 13 further comprising a storage case to store the tool ends when they are not in use.

17. The vehicle of claim 16 wherein the storage case is coupled to the vehicle.

18. An apparatus comprising:
a mounting bracket configured to mount to an outer surface of a body panel of a vehicle;
a latch mechanism coupled to the mounting bracket; and
an elongate member detachable from the mounting bracket and insertable into the opening, the elongate member comprising:
 a body and a handle comprising a rod having a diameter smaller than the opening to allow the elongate member to be inserted into and removed from the opening;
 a handle comprising a coupling mechanism configured to engage with the latch mechanism so that the elongate member can be secured to the mounting bracket such that, when secured, at least a portion of the body of the elongate member is positioned within an inside cavity of the body panel; and
 a detachable coupling mechanism configured to detachably engage with one or more tool ends.

19. An apparatus comprising:
a mounting bracket configured to mount to an outer surface of a body panel adjacent to an opening in the body panel, wherein the mounting bracket comprises a flange having a size larger than the opening and a surface that mounts to the outer surface of the body panel;
a latch mechanism coupled to the mounting bracket;
an elongate member detachable from the mounting bracket and insertable into the opening, the elongate member comprising a body and a handle, the body comprising a rod having a diameter smaller than the opening to allow the elongate member to be inserted into and removed from the opening, the elongate member comprising a coupling mechanism configured to engage with the latch mechanism so that the elongate member can be secured to the mounting bracket such that, when secured, at least a portion of the body of the elongate member is positioned within an inside cavity of the body panel.

* * * * *